Sept. 22, 1964 J. H. GARD 3,150,272

TRIANGULAR WAVEFORM GENERATOR WITH MEANS FOR SELECTIVELY ALLOWING WIDE-ANGLE SWING OF WAVEFORM SLOPES

Filed April 25, 1961 4 Sheets-Sheet 1

INVENTOR.
JEROLD H. GARD

BY Brown, Jackson, Boettcher & Dienner

ATTYS.

TRIANGULAR WAVEFORM GENERATOR WITH MEANS FOR SELECTIVELY ALLOWING WIDE-ANGLE SWING OF WAVEFORM SLOPES

Filed April 25, 1961 4 Sheets-Sheet 2

INVENTOR.
JEROLD H. GARD
BY Brown, Jackson, Boettcher & Dienner
ATTYS.

INVENTOR.
JEROLD H. GARD
BY Brown, Jackson, Boettcher & Dienner
ATTYS.

INVENTOR.
JEROLD H. GARD
BY Brown, Jackson, Boettcher & Dienner
ATTYS.

3,150,272

TRIANGULAR WAVEFORM GENERATOR WITH MEANS FOR SELECTIVELY ALLOWING WIDE-ANGLE SWING OF WAVEFORM SLOPES

Jerold H. Gard, Mountain View, Calif., assignor, by mesne assignments, to Kaiser Aerospace & Electronics Corporation, Oakland, Calif., a corporation of Nevada Filed Apr. 25, 1961, Ser. No. 112,740
16 Claims. (Cl. 307—88.5)

This invention is directed to a waveform generator for producing a desired voltage or current curve. More particularly, the invention concerns the generation of a variable sawtooth waveform having adjustable polarity and slope or gradient characteristics over one or more portions of the waveform.

Conventional sawtooth generator circuits attempt to produce a voltage waveform having a sloping portion indicating a gradual departure at a fixed rate or gradient from a reference condition, and a substantially vertical portion which represents the return to the reference or initial condition. In certain instances it may be desirable to portray a change in information or in a reference waveform by effecting a related change in the slope of the sawtooth waveform. In other instances it is desirable to provide a generator in which the direction (positive- or negative-going) and/or the gradient of a sawtooth waveform may be conveniently and expeditiously varied at any point. Such regulation can provide contiguous portions of a waveform which slop in different directions at different gradients, thus affording a practically unlimited variety of waveforms. An important object of this invention therefore is the provision of simple and expeditious gradient control means for readily varying the slope of a sawtooth waveform through a range approaching 180°, and also to vary the slope and/or the direction of slope to portray a broad range of information.

Still another object of the invention is the use of an easily generated and modulated step function or square wave type signal to adjust the slope of a sawtooth waveform.

Another object of the invention is the provision of polarity selection means to afford a positive-going or negative-going sawtooth signal. Such polarity selection means, when accompanied by the gradient control regulation described above, effectively varies the slope of a sawtooth waveform at a given "hinge" or reference point over a range approaching 180°.

It is apparent that with two or more contiguous portions of different slope, when such portions are continuously adjustable both as to the direction and the gradient of the slope, the ultimate voltage which appears across a charging capacitor at the end of the waveform-generating cycle may be either positive or negative. Accordingly another object of the invention is the provision of a novel discharge circuit for rapidly removing the accumulated charge from the charging capacitor during the retrace time or at the end of the charging cycle, irrespective of the polarity of such accumulated charge.

The foregoing and other objects of the invention are achieved in a novel circuit including a charging capacitor across which the voltage waveform, which may have two or more portions of different slope, is developed. Step function control means are provided to regulate both the direction and the slope of the modified sawtooth waveform developed across the charging capacitor. In a preferred embodiment, a step function or square wave type signal is used to control a semiconductor switch, such as a transistor, connected in the charging circuit for the capacitor. The step portions of the square wave signal regulate the conduction and non-conduction of such switching transistor, while the amplitude or D.-C. level of the square wave signal determines the conduction level of the switching transistor and thus regulates the charging rate of the capacitor to determine the gradient of the sawtooth waveform. The direction of current flow in the charging circuit determines the polarity of the charge accumulated across the capacitor and thus the polarity of the sawtooth waveform. In this manner a square wave signal, the width and amplitude of which are readily modulated, is utilized to control the generation of a variable sawtooth waveform.

The polarity of the sawtooth waveform can be reversed by reversing the direction of current flow in the charging circuit. Thus two separate semiconductor switches or transistors can be provided in the charging circuit, and selectively gated by square wave signals to provide either a positive- or a negative-going sawtooth waveform. The novel waveform generator of the invention further comprises a discharge circuit for rapidly passing the net charge accumulated on the capacitor to ground, thus discharging the capacitor prior to the next charging cycle. The discharge circuit essentially comprises a pair of discharge paths, each including a semiconductor switch and each parallel-coupled with the charging capacitor. Each path passes current in only one direction as its respective switch is closed, and the two paths are connected to pass current in opposite directions. Thus the discharge circuit is effective to remove the accumulated charge, no matter the polarity of such potential with respect to ground.

Now in order to acquaint those skilled in the art with the manner of constructing and utilizing the invention, a preferred embodiment thereof will be described and explained in connection with the accompanying drawings, in the several figures of which like reference numerals identify like elements and in which.

*General Description of the Invention*

Figure 1:
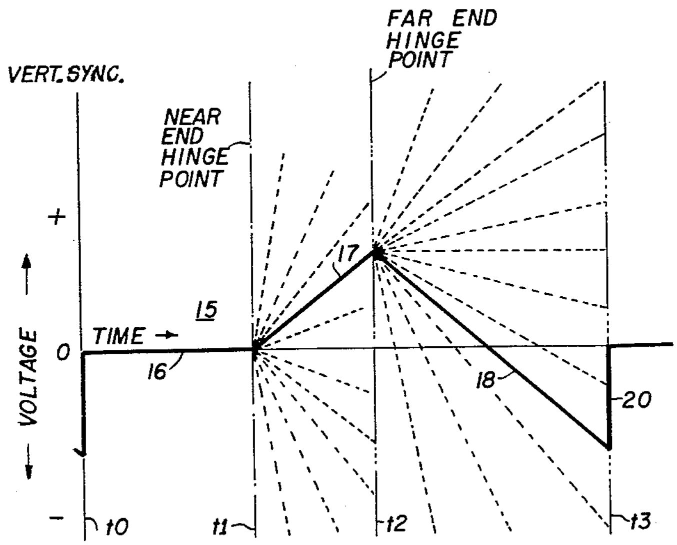
FIGURE 1 is a graphical illustration of various deflection voltage waveforms which can be achieved by practice of the invention.

A sawtooth waveform of any desired type can be selected from the great variety of waveforms reproduced with the novel circuit of the invention. As shown generally in FIGURE 1, the inventive structure provides a waveform referenced generally as 15 which includes an initial horizontal portion 16 at the zero or reference level, which portion is produced between times $t0$ and $t1$. A first hinge point coincides with the end of horizontal portion 16 at $t1$. "Hinge point," as used herein and in the appended claims, refers to a point on the waveform at which the slope is adjustable through a range approaching 180°. A "near end hinge point" is one near the beginning of the waveform, or one which occurs soon after a sync pulse or other time reference which initiates or synchronizes generation of the waveform. A "far end hinge point" is one which occurs farther along the waveform, or later in time, than a near end hinge point.

As the waveform reaches the near end hinge point at time $t1$, by providing a square wave signal of proper polarity and amplitude as explained above, a sawtooth or sloping waveform signal of a related polarity and amplitude is produced between times $t1$ and $t2$, or between the near end and far end hinge points. In the drawing the waveform segment of desired slope, represented by line 17, is selected from all the waveform segments of different slopes (illustrated by the broken lines between $t1$ and $t2$) which can extend from the first hinge point over nearly 180° of different gradients.

At time $t2$, when the initial sloping portion 17 reaches the far end hinge point, the slope of curve 15 is again adjustable through a range approaching 180° as indicated by the broken lines. As shown a waveform segment 18 having a negative gradient as indicated comprises that part of waveform 15 between times $t2$ and $t3$, or between the far end hinge point and the end of the adjustable gradient portion of the waveform. At the end of each cycle, the waveform is returned to the zero or reference level as indicated by the vertical portion 20 of waveform 15.

Those skilled in the art will appreciate that a great variety of composite waveforms can be depicted by the adjacent waveform portions having slopes adjustable through a range of nearly 180° at each hinge point.

Figure 2:
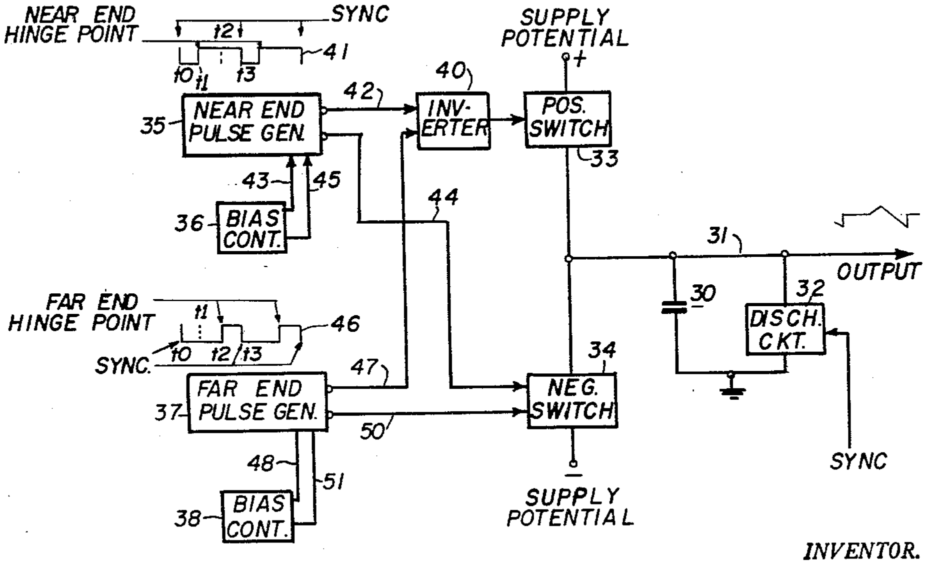
FIGURE 2 is a block diagram depicting certain salient components of a preferred embodiment of the inventive system.

The simplified block diagram of FIGURE 2 illustrates certain of the essential components for providing the requisite charging currents to an energy storage means or charging capacitor 30 to effect the presentation of a voltage waveform on the output conductor 31 which is adjustable to include the wave shape variations shown in FIGURE 1.

In FIGURE 2 a positive potential is made to appear across capacitor 30 by completion of a constant-current charging circuit therefor, the circuit being closed in FIGURE 2 by a switch 33 which may be of semiconductor material, such as a transistor. With the completion of the positive charging circuit, capacitor 30 is charged toward the level of the positive supply potential applied to switch 33, thus providing a waveform of positive-going slope such as portion 17 of waveform 15 in FIGURE 1. When negative switch 34, which may also be a semiconductor, is closed an obvious negative constant-current charging circuit is provided for capacitor 30 over the negative switch to a point of negative potential as indicated, and the capacitor receives a negative charge to provide a negative-going slope (e.g., 18 in FIGURE 1) in the waveform appearing on conductor 31. No matter the net charge at the end of each cycle, whether positive or negative, the discharge circuit 32 is effective to quickly remove the charge in an expeditious manner, as represented by the vertical portion 20 of waveform 15 in FIGURE 1.

The selective closing and opening of the positive and negative switches 33 and 34 in FIGURE 2 is controlled by a near end pulse generator 35, a bias control unit 36 for the near end pulse generator, a far end pulse generator 37, a bias control unit 38 for the far end pulse generator, and an inverter stage 40. The inverter stage is provided between the pulse generators and the positive switch to invert the positive-going gating signals provided by pulse generators 35 and 37, to supply a negative pulse for closing switch 33. Switch 34 is of the type which is closed or rendered conductive upon receipt of a positive pulse, and thus no inverter is required therefor.

The output voltage waveform 41 from near end pulse generator 35 is shown above the pulse generator. The times at which a negative-going synchronizing (sync) pulse is applied thereto are indicated by arrows, and the steep positive-going portion of the waveform which determines the location of the near end hinge point of the output voltage waveform at time $t1$ is also indicated. The provision of this square wave as shown is such that the occurrence of the steep positive-going portion relative to the time of the sync is adjustable to regulate the occurrence of the near end hinge point on the output voltage waveform. As will be explained subsequently, the low amplitude segment of waveform 41 between times $t0$ and $t1$ represents the application of a control signal to the near end pulse generator of a level such that no output signal is produced during this interval. At time $t1$ the control signal is altered in value to provide a signal at the output terminals as determined by application of bias potentials from bias control unit 36 over conductors 43 and 45. Further, the amplitude of the square wave signals at the output terminals can be regulated by adjusting the levels of D.-C. bias voltage signals supplied by bias control unit 36 to regulate the amplitude of the output signals from the near end pulse generator, and thus adjust the drive applied to the positive and negative semiconductor switches, thereby regulating the level of the charging current through these switches and thus the slope of the output voltage waveform. Likewise, the bias control unit can provide a bias voltage signal which effectively prevents the application of any output signal from the near end pulse generator to either inverter unit 40 or negative switch 34, thus preventing the simultaneous closure of both the positive and negative switches.

Unless prevented by the application of a suitable D.-C. bias voltage signal from bias control unit 36 over conductor 43, the output signal from one output terminal of near end pulse generator 35, as represented by the waveform 41, is passed over conductor 42 to inverter stage 40, in which the signal is inverted and then applied as a negative gating impulse to close positive switch 33, thereby completing an obvious positive charging circuit for capacitor 30. At the same time, unless disabled by application of a D.-C. bias voltage signal of suitable level from control unit 36 over conductor 45, the output signal from the other output terminal of pulse generator 35 is also applied over conductor 44 to close negative switch 34, and complete a negative charging circuit for capacitor 30. Thus it is evident that the bias control unit 36 can normally be utilized to regulate the amplitude of the square wave gating signal applied to one of the positive and negative switches, while simultaneously preventing the application of any gating signal to the other switch. Alternatively, the bias control unit can supply suitable D.-C. bias voltage signals over conductors 43 and 45 to prevent the application of any gating signal, so that neither of the positive and negative switches is closed and a constant or zero level signal is maintained on output conductor 31 from $t0$ to $t1$.

The output voltage waveform 46 of far end pulse generator 37 is depicted above the generator. This signal is also a square wave, like that from the near end pulse generator, with the negative-going portions determined by sync pulses applied to the different points in the system at the same time. However, the positive-going portion of waveform 46 occurs later in time than does the related portion of the near end signal 41. Accordingly the gating signal 46 from far end pulse generator 37 is effective to gate the positive and/or negative switch at a later time, $t2$, after the near end pulse generator has had the opportunity to modify the output voltage waveform between the near end and far end hinge points or between $t1$ and $t2$. The square wave signal from one output terminal of the far end pulse generator is applied over conductor 47 (unless prevented by application of a D.-C. bias signal of suitable level from bias control unit 38 over conductor 48) to inverter 40, in which it is inverted and applied to positive switch 33 to turn on or gate this switch and complete the positive charging circuit for capacitor 30. Likewise, an output signal from the other output terminal of the far end pulse generator is applied over conductor 50 (unless prevented by application of a D.-C. bias signal of suitable level from control unit 38 over conductor 51) to close negative switch 34, thus to complete a negative charging circuit for charging capacitor 30. A D.-C. bias voltage signal of suitable level can be supplied from bias control unit 38 to regulate the amplitude of the square wave signal output over both conductors 47 and 50, or to effectively cancel both square wave signals. With this general perspective of the system, the specific circuitry utilized in providing a desired voltage waveform will now be described.

*Detailed Description of the Invention*

Figure 3:
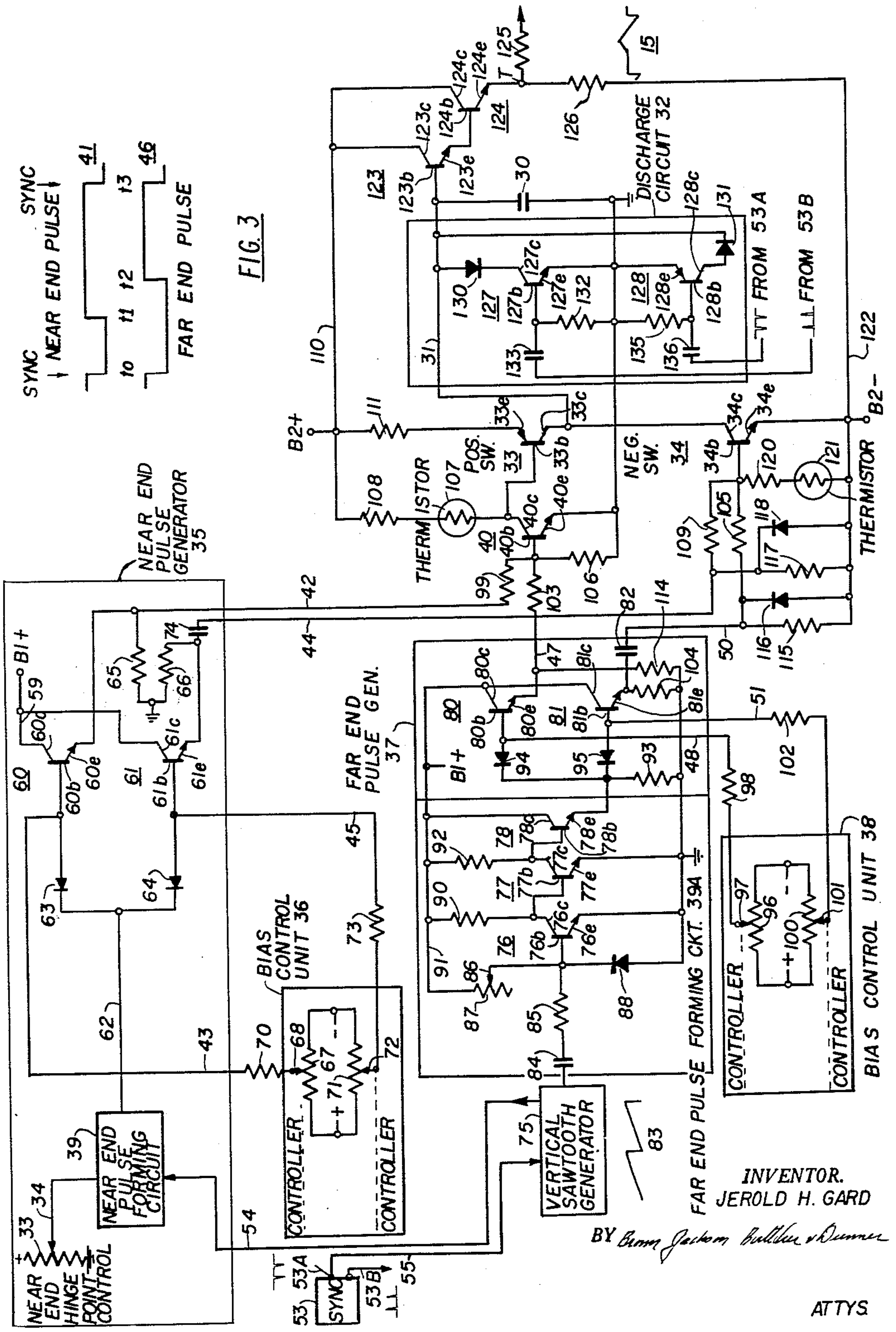
FIGURE 3 is a schematic diagram illustrating in detail the system shown generally in FIGURE 2.

Referring now to FIGURE 3, the uppermost portion of this schematic diagram illustrates the components of the near end pulse generator 35 including pulse forming circuit 39, bias control unit 36, and two NPN type transistors 60 and 61 each connected in an emitter-follower configuration to pass output signals over conductor 42 to inverter stage 40 and also over conductor 44 to negative switching transistor 34. Although transistors 60 and 61 are both indicated as of the NPN type, those skilled in the art will recognize that such transistors can be replaced by PNP type transistors, with the concomitant polarity reversal of the operating, bias, and gating potentials applied thereto. Such replacement and polarity reversal are also possible with the other transistors to be described hereinafter, whether of the NPN type or PNP type as illustrated in the preferred embodiment of FIGURE 3.

In more detail a conventional sync generator 53, which provides sync pulses for timing the various circuit operations, has an output terminal 53A coupled over conductor 55 to sawtooth generator 75, which produces a voltage of sawtooth waveform as referenced by numeral 83. The sawtooth waveform is applied over conductor 54 to near end pulse forming circuit 39. Potentiometer 33 includes a movable arm 34 coupled to circuit 39 for regulating the occurrence of the near end hinge point, or determining time *t1*, in a manner which will be explained subsequently in connection with the far end pulse generator. Near end pulse forming circuit 39 is coupled over conductor 62 to the cathode side of each of rectifiers 63 and 64. The anode of rectifier 63 is coupled to base *60b* of transistor 60, of which collector *60c* is connected over supply conductor 59 to a point of unidirectional operating potential, conventionally designated B1+. Emitter *60e* is connected both to output conductor 42 and over emitter load resistor 65 to ground. The other diode 64 has its anode coupled to base *61b* of transistor 61, and collector *61c* is also coupled to supply conductor 59. Emitter *61e* is connected over load resistor 66 to ground and over capacitor 74 to output conductor 44.

Bias control unit 36 includes a first bias control potentiometer 67 connected between points to which positive and negative unidirectional operating potentials are applied. Potentiometer 67 has a movable arm 68 coupled over resistor 70 and conductor 43 to the common connection between diode 63 and base *60b* of transistor 60. Bias control unit 36 further comprises a second bias control potentiometer 71, parallel-coupled with potentiometer 67, and having a movable arm 72 coupled over a fixed resistor 73 and conductor 45 to the common connection of diode 64 and the base of transistor 61. Accordingly, the position of movable arm 68 on potentiometer 67 determines the level of the D.-C. bias voltage signal continually applied to the base of transistor 60, and thus regulates the amplitude of the square wave output from this transistor in the absence of a control signal output from circuit 39 which clamps base *60b* to ground. Similarly, the position of movable arm 72 on potentiometer 71 determines the level of the bias potential signal applied over conductor 45 to the base of transistor 61, similarly regulating the amplitude of the output waveform passed by this transistor in the absence of a control signal output from circuit 39 which clamps base *61b* to ground.

Potentiometers 67 and 71 can have the positions of their respective movable arms adjusted by a controller such as a servo motor, or other means for translating an electrical signal into a mechanical displacement. Those skilled in the art will recognize that the bias level controls (potentiometers 67 and 71) can be replaced by electronic circuitry such as a function generator, to produce a waveform of particular configuration for application over conductors 43 and 45 to the bases of the respective transistors. For the purposes of this explanation, however, it is sufficient to indicate an elementary means for adjusting the bias potential at the bases of the emitter-follower transistors 60 and 61.

Thus, the output signal from emitter *60e* of transistor 60 over conductor 42 is a square wave such as that identified by numeral 41 with the amplitude thereof regulated by the D.-C. level of the bias voltage signal supplied over conductor 43 to base *60b* of this transistor. A similar signal, with its amplitude similarly regulated by the D.-C. level of the bias voltage signal applied from potentiometer 71 over conductor 45 to base *61b* of transistor 61, is passed over capacitor 74 and output conductor 44 to negative switching transistor 34. The manner in which a control signal applied over diodes 63 and 64 maintains both transistors 60 and 61 non-conductive between *t0* and *t1* will be explained hereinafter.

The far end pulse generator 37 of FIGURE 2, as shown in detail in FIGURE 3, includes far end pulse forming circuit 39A which is coupled to vertical sawtooth generator 75. Pulse forming circuit 39A includes a pair of NPN type transistor amplifiers 76 and 77, and an emitter-follower NPN type transistor 78. A pair of emitter-follower NPN type output transistors 80 and 81 are coupled to the far end pulse forming circuit. The output signal from the emitter of transistor 80 is applied over conductor 47 and resistor 103 to inverter stage 40, and the signal from transistor 81 is applied over capacitor 82, conductor 50 and resistor 105 to the negative switching transistor 34. The far end pulse forming circuit 39A will now be described in greater detail, it being noted that near end pulse forming circuit 39 is of a similar structure.

Vertical sawtooth generator 75 produces an output voltage waveform such as that indicated by numeral 83, which signal is applied over capacitor 84 and resistor 85 to base *76b* of transistor amplifier 76. Base *76b* is connected over movable arm 86 and a portion of potentiometer 87 to supply conductor 91, to which is supplied a unidirectional operating potential designated B1+. Base *76b* is further coupled over a diode 88 to ground, and emitter *76e* is connected directly to ground. Collector *76c* of this transistor is connected over resistor 90 to supply conductor 91, and collector *76c* is also connected to base *77b* of the second transistor amplifier 77, of which emitter *77e* is connected directly to ground. Collector *77c* is connected over resistor 92 to supply conductor 91, and to base *78b* of transistor 78.

The emitter-follower transistor 78 has its collector *78c* connected directly to supply conductor 91, and emitter *78e* is connected both over emitter load resistor 93 to ground, and to the cathode of each of diodes 94 and 95. The anodes of these diodes are connected to the bases of emitter-follower transistors 80 and 81, respectively.

A square wave signal 46 is formed by the amplification to saturation in transistors 76 and 77 of a portion of the sawtooth signal 83 supplied by the vertical sawtooth generator 75. Adjustment of the position of movable arm 86 along potentiometer 87 determines the D.-C. voltage level, and hence the time, at which transistor 76 begins conducting, thus determining the occurrence of the positive-going step portion of output waveform 46, which in turn controls time *t2*, or the far end hinge point, on the waveform.

Bias control unit 38 includes a first bias control potentiometer 96 connected between points to which suitable positive and negative potentials are applied, and this potentiometer has a movable arm 97 connected over a resistor 98 and conductor 48 to base 80b of transistor 80. The bias control unit further comprises a second bias control potentiometer 100 parallel-coupled with potentiometer 96, and having a movable arm 101 connected over resistor 102 and conductor 51 to base 81b of emitter-follower transistor 81. As is evident from the foregoing explanation in connection with the output signals from transistors 60 and 61, the D.-C. levels of the bias voltage signals supplied over conductors 48 and 51 to bases 80b and 81b effectively regulate the amplitude of the square wave signals at the emitters of transistors 80 and 81.

Collector 80c of transistor 80 is connected directly to supply conductor 91, and emitter 80e of this transistor is coupled both over emitter load resistor 114 to ground and over conductor 47 and resistor 103 to base 40b of inverter stage 40. Likewise collector 81c of transistor 81 is connected to supply conductor 91, and its emitter 81e is coupled both over emitter load resistor 104 to ground and over capacitor 82, conductor 50, and resistor 105 to base 34b of the negative switching transistor 34. A first bias circuit comprising resistor 115 and diode 116 is connected between output conductor 50 and negative supply conductor 122, and a second bias circuit including resistor 117 and diode 118 is connected between output conductor 44 and negative supply conductor 122.

Considering now the NPN type inverter transistor 40, the base 40b thereof is connected over resistor 106 to ground, and emitter 40e is connected directly to ground. Collector 40c is connected over a Thermistor or temperature-compensating unit 107 and resistor 108 to supply conductor 110, to which a unidirectional operating potential of positive polarity, designated B2+, is applied. Collector 40c is also connected to base 33b of PNP type transistor 33, the positive switching transistor of the novel circuit. Emitter 33e of this transistor is connected over resistor 111 to supply conductor 110. In the illustrated embodiment, resistor 111 and the conductors connected thereto comprise input means for applying a voltage of given polarity from supply conductor 110 to the emitter of transistor 33. Collector 33c of transistor 33 is connected over conductor 31 to the upper plate of charging capacitor 30, the lower plate of which is connected directly to ground. Thus it is evident that with conduction of transistor 33, an obvious positive constant-current charging circuit for capacitor 30 is established. The constant current level conducted by transistor 33 depends upon the drive or the amplitude of the square wave signal applied thereto, thus affording a charging current of adjustable level to correspondingly adjust the slope of the output voltage waveform.

Transistor 34, an NPN type unit, is the negative switching transistor of the novel system, and the base 34b thereof is connected over a resistor 120 and a Thermistor or temperature-compensating device 121 to negative supply conductor 122, to which is applied a negative unidirectional potential designated B2—. Emitter 34e is connected directly to negative supply conductor 122 by a conductor which can be considered input means for applying a voltage of given polarity to emitter 34e. Collector 34c of transistor 34 is connected over conductor 31 to the upper plate of charging capacitor 30. Accordingly, with conduction of transistor 34, a negative constant-current charging path is established for charging capacitor 30. The level of conduction of transistor 34 is a function of the amplitude of the square wave gating signal applied thereto, thus affording a constant current charging path for the capacitor 30. There are no asymmetries in either of the negative and positive charging circuits, which provide a constant charging current to effect the charge storage in capacitor 30.

The output voltage waveform developed across charging capacitor 30 is translated over emitter-follower NPN type transistors 123 and 124 to output terminal T, and over output resistor 125 to an associated circuit (not shown). Base 123b of transistor 123 is connected directly to conductor 31, and collector 123c is connected to supply conductor 110. Emitter 123e is connected to base 124b of the transistor 124, the collector 124c of which is connected to supply conductor 110. Emitter 124e is connected to terminal T, which is connected both to resistor 125 and over resistor 126 to negative supply conductor 122. Accordingly the voltage waveform appearing along conductor 31 is translated with unchanged polarity to resistor 125.

Discharge circuit 32 actually comprises two separate discharge paths, each of which includes a semiconductor switch. That is, NPN type transistor 127 is connected as a positive discharge switch to complete a positive discharge path over diode 130 to collector 127c of positive discharge switch 127, the emitter of which is connected directly to ground. Base 127b of this transistor is connected over resistor 132 to ground, and over a coupling capacitor 133 to terminal 53B of sync generator 53, at which positive polarity sync pulses are provided. Accordingly positive gating pulses are applied from terminal 53B over capacitor 133 to the base of positive discharge switch 127, thus to gate this transistor and complete a discharge path over diode 130 to remove any accumulated net positive charge from the upper plate of capacitor 30.

Concerning the negative discharge path, the upper plate of capacitor 30 is coupled over conductor 31 and diode 131 to collector 128c of the negative discharge switch 128, the emitter of which is connected directly to ground. Base 128b is connected over a resistor 135 directly to ground, and over a coupling capacitor 136 to terminal 53A of sync generator 53, which applies negative sync or gating pulses to the base of negative discharge switch 128 at the same time positive sync pulses are applied to the base of transistor 127. Each time a negative gating pulse is applied to base 128b of transistor 128, the transistor is rendered conductive and completes the negative discharge path from ground over this transistor and diode 131 to the upper plate of capacitor 30, thus affording immediate discharge of any net negative charge accumulated during the charging cycle. Accordingly, no matter the polarity of the accumulated net charge on capacitor 30 when the positive and negative sync pulses are concomitantly applied to the positive discharge switch 127 and negative discharge switch 128, the charge will be instantaneously removed and the capacitor returned to a zero or reference level for receiving the charge during the next cycle of operation.

*Operation of the Invention*

The operation of the circuit set forth generally in FIGURE 2 and schematically in FIGURE 3 to provide a practically unlimited number of waveform variations will be explained in conjunction with the voltage waveforms depicted in FIGURES 4A–4P. The waveform identified by numeral 15 in FIGURE 1 is reproduced to serve as a reference in this explanation.

Figures 4A, 4B, 4C, 4D, 4E, 4F, 4G, 4H, 4J:
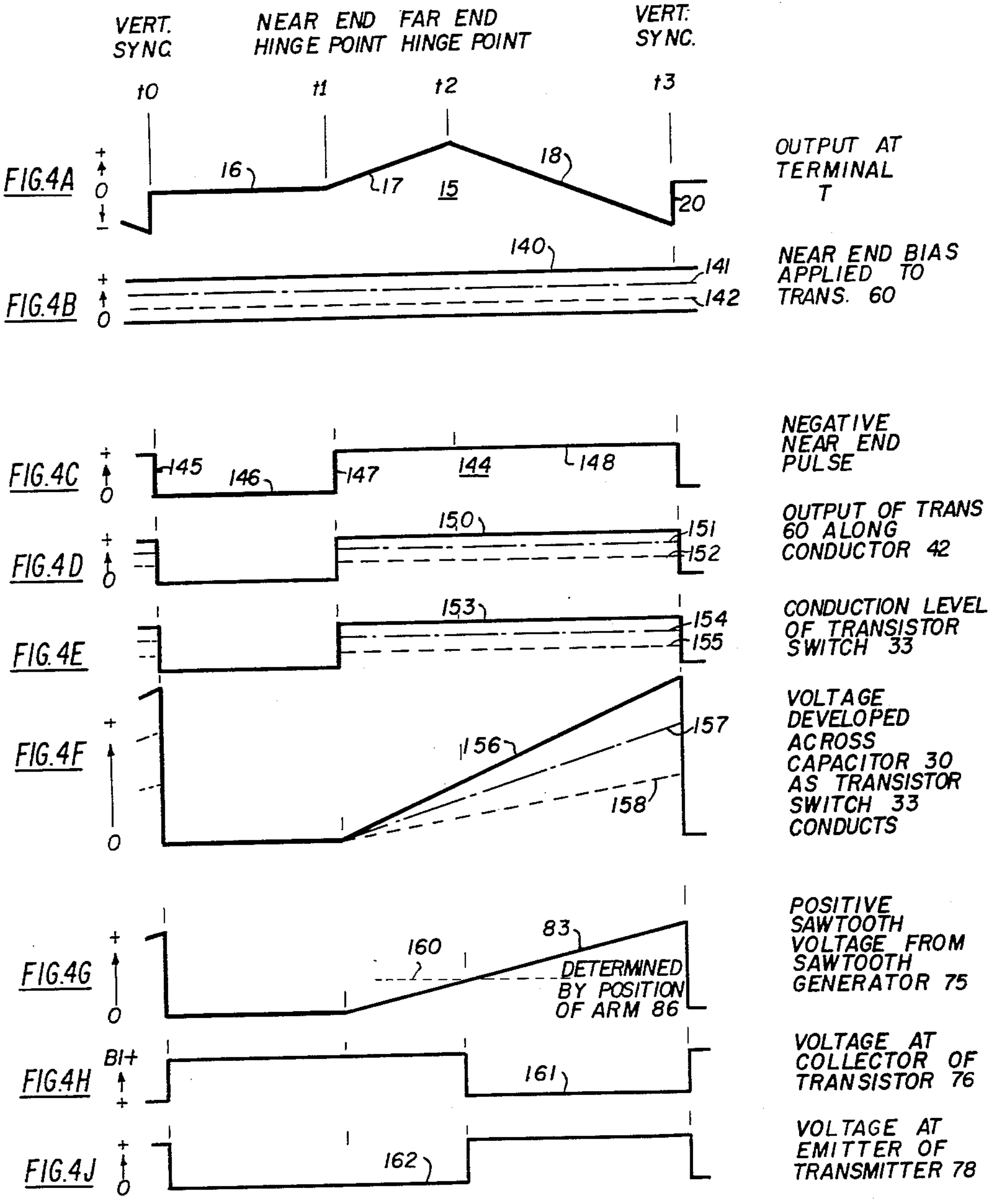
FIGURES 4A–4H, 4J–4N and 4P are graphical representations useful in understanding the operation of the system shown in FIGURE 3.

Considering waveform 15 in FIGURE 4A and the circuitry illustrated generally in FIGURE 2, the initial horizontal or zero reference portion 16 of waveform 15 is produced between times *t0* and *t1* when neither positive switching means 33 nor negative switching means 34 is conducting. At time *t1*, or at the near end hinge point, the slope of waveform 15 must be altered to produce the positive-going portion 17 between times *t1* and *t2*. This is accomplished by turning on, or gating, positive switch 33 during this interval to complete the positive charging circuit for capacitor 30 and produce portion 17 of waveform 15. The slope of portion 17 is a function of the constant conduction level of transistor switch 33 between times *t1* and *t2*.

To regulate this conduction level, near end pulse generator 35 together with bias control unit 36 can be considered as gating means for producing a gating signal, and more particularly, a gating signal of the square wave type. The portion of the gating signal which determines the conduction level of the switching means is of variable amplitude, being regulated by an adjustment within the bias control unit which is a part of the gating means. Negative switch 34 is not closed during the interval from *t1* to *t2*.

At the far end hinge point, or at time *t2*, it is desired to reverse the slope or gradient of waveform 15 and produce the negative gradient portion 18 between times *t2* and *t3*. Another gating means, comprising far end pulse generator 37 and bias control unit 38, is provided to govern circuit operations at *t2*. This negative gradient is provided by gating or turning on negative switch 34 at *t2*, while positive switch 33 continues to conduct. The conduction level of negative switch 34, as controlled by the high-amplitude gating signal applied thereto, is higher than the conduction level of positive switch 33, so that charging current flows from negative supply potential over the negative switch to conductor 31, whence a portion of the current flows through positive switch 33 to positive supply potential and the remainder of the current flows through capacitor 30 to ground to first remove the accumulated positive charge and then provide a negative charge across this capacitor during the interval from *t2* to *t3*. Accordingly at time *t3* the negative-going portion 18 of waveform 15 has been provided, and it is only necessary to return the circuit to the zero or initial reference condition prior to the initiation of the next charging cycle. This is accomplished by energizing discharge circuit 32 and rapidly discharging capacitor 30, as indicated by the steep portion 20 of waveform 15 in FIGURE 4A. The various circuit operations for providing a voltage waveform of the desired configuration will now be described in connection with the detailed circuitry of FIGURE 3.

To provide the initial zero-voltage portion 16 of the output waveform at output terminal T in FIGURE 3, both the positive and negative switches 33 and 34 are retained in the non-conductive condition between times *t0* and *t1*. This is accomplished by applying suitable bias potentials to the bases of transistors 60 and 61 at the output side of the near end pulse generator arrangement, and similarly biasing the output transistors 80 and 81 of the far end pulse generator to ensure that none of these transistors are rendered conductive to pass a gating signal to either of switches 33 and 34. More specifically, ground potential is applied from arm 72 of potentiometer 71 to base 61*b* to maintain stage 61 non-conductive throughout the charging cycle, from *t0* to *t3*. A positive bias voltage potential is applied from potentiometer 67 to base 60*b*, but transistor 60 is maintained non-conductive between *t0* and *t1* as its base is clamped to ground by application of ground potential thereto over diode 63 during this interval. This blanking signal is shown as segment 146 of waveform 144 in FIGURE 4C. At time *t1* output transistor 60 of the near end pulse generator can be rendered conductive, as its base is no longer clamped to ground, to gate on transistor switch 33, while both of the output transistors 80 and 81 in the far end pulse generator are maintained non-conductive. This gating operation in the near end pulse generating circuit will now be described.

To provide the positive gradient portion 17 of waveform 15, positive transistor switch 33 is gated on at time *t1*. This is accomplished by causing transistor 60 in the near end pulse generator to conduct at this time. As noted above, a bias voltage potential positive with respect to ground is provided by the proper setting of arm 68 of the positive switch near end bias potentiometer 67, which positive potential is applied over resistor 70 to base 60*b* of transistor 60. Such positive bias potential is indicated by reference numeral 141 in FIGURE 4B; the bias potential can be adjusted to a higher level, as indicated by curve 140, or set to a lower value, as referenced by waveform 142. Accordingly, absent any other signal applied to the base of transistor 60, such transistor would continuously conduct at a level determined by the value of the bias potential coupled thereto.

The negative near end control signal or pulse 144, which is the output signal from near end pulse forming circuit 35, is illustrated in FIGURE 4C. This control signal comprises a first negative-going step portion 145, where the level of the signal voltage falls rapidly from a positive potential to ground or zero voltage, a constant-level portion 146 of zero potential, a positive-going step portion 147 where the signal level rapidly rises to a positive voltage value, and a last horizontal or positive portion 148. This control signal is applied over conductor 62 to the cathodes of diodes 63 and 64, and is passed by the diodes to the bases of transistors 60 and 61 to clamp base 60*b* and base 61*b* to ground potential during the interval from *t0* to *t1*. Thus transistor 60 cannot conduct during this interval.

At time *t1*, the near end pulse signal 144 (FIGURE 4C) goes positive, but base 61*b* of transistor 61 is held at ground potential by the bias voltage applied over conductor 45 to base 61*b*. Transistor 60, however, begins to conduct at time *t1* by reason of the positive bias potential applied over conductor 43 to base 60*b*. As transistor 60 conducts an output signal which goes positive at time *t1* is translated over conductor 42 and resistor 99 to base 40*b* of inverter stage 40.

The level of the output signal from transistor 60 is a function of the level of the bias voltage potential applied over conductor 43 to base 60*b* thereof. More specifically, referring to FIGURE 4B, if the level of the positive bias voltage applied from potentiometer 67 to base 60*b* were that referenced by numeral 140 the level of the signal passed by transistor 60 would be that indicated by numeral 150 in FIGURE 4D. If the positive bias level is reduced to the level indicated by waveform 141, the conduction level of transistor 60 drops to that depicted by waveform 151 in FIGURE 4D. If the level of the applied bias voltage were reduced even farther to the value indicated by broken line 142 in FIGURE 4B, the level of the output signal from transistor 60 would be similarly reduced to that indicated by waveform 152 in FIGURE 4D. It is assumed that a bias voltage as indicated by waveform 141 is applied, producing an output signal from transistor 60 as referenced by waveform 151 in FIGURE 4D.

Because NPN transistor 40 functions solely as an inverter stage, it is apparent that the output signal from transistor 60 along conductor 42 is inverted in stage 40, and the inverted signal is utilized to regulate the conductivity of PNP type transistor 33. Thus the conduction level of positive switch transistor 33 is related to the level of the output signal translated over conductor 42 to inverter stage 40. Specifically, the level of the current flowing toward collector 33*c* and away from emitter 33*e* of transistor 33 is a function of the level of the gating signal applied to base 33*b*. Various conduction levels of transistor 33 are depicted in FIGURE 4E. A large current flow or high conduction level, referenced by numeral 153, is established by a gating signal such as waveform 150 in FIGURE 4D, an intermediate conduction level 154 is established in switch 33 responsive to the provision of an intermediate level gating signal 151, and a lower level of current as indicated by numeral 155 is provided through positive switch 33 when a gating signal of level 152 is provided.

As positive transistor switch 33 is rendered conductive, a positive charging path for capacitor 30 is established from ground over capacitor 30, conductor 31, transistor 33, and resistor 111 to positive supply potential at conductor 110. Accordingly a positive charging current flows at a constant level, as determined by the conduction level of transistor 33, throughout the interval from t1 to t3. Thus, with the conduction level of transistor switch 33 at the highest value, as indicated by waveform 153 in FIGURE 4E, a positive charge is accumulated across capacitor 30 as indicated by waveform 156 in FIGURE 4F. If the conduction level of transistor 33 is that indicated by numeral 154 in FIGURE 4E, the charging rate of capacitor 30 is similarly lowered to produce an output voltage thereacross as referenced by numeral 157 in FIGURE 4F. In analogous manner, if the conduction level of transistor switch 33 is that indicated by numeral 155 in FIGURE 4E, the slope of the voltage waveform developed across capacitor 30 is that indicated by numeral 158 in FIGURE 4F.

A comparison of the various voltage waveforms 156–158 in FIGURE 4F with segment 17 of voltage waveform 15 in FIGURE 4A indicates that the portion of waveform 156 developed between times t1 and t2 can be utilized to provide segment 17 of waveform 15. However, at t2 or at the far end hinge point, the gradient of the voltage developed across capacitor 30 must be altered from the positive-going to a negative-going slope, and this can be accomplished by effecting the conduction of negative transistor switch 34 at a level exceeding the conduction level of transistor 33 between times t2 and t3.

To produce the desired conduction of transistor switch 34 at time t2, a suitable gating signal must be provided from transistor 81 in the far end switching circuitry and extended over conductor 50 to base 34*b* of transistor switch 34. Considering now the development of the far end gating signal, vertical sawtooth generator 75 produces a signal such as that identified by numeral 83 in FIGURE 4G. This sawtooth signal is applied over capacitor 84 and resistor 85 to base 76*b* of transistor 76. The level of the positive bias potential applied to the base of this NPN type transistor is determined by the setting of movable arm 86 of potentiometer 87, thus determining the time at which transistor 76 begins to conduct. The bias level established by the setting of arm 86 is represented by broken line 160 in FIGURE 4G. Those skilled in the art will recognize that variation of the bias potential level correspondingly varies the time at which transistor 76 commences to conduct, thus varying the occurrence of t2 or the far end hinge point. The near end hinge point, at t1, can be varied in exactly the same manner by adjusting the position of arm 34 on potentiometer 33.

As transistor 76 commences to conduct, the voltage level at collector 76*c* drops rapidly, as shown by waveform 161 in FIGURE 4H. This negative-going signal is inverted in transistor stage 77, and a positive-going signal is applied to base 78*b* of transistor 78. This transistor functions as an emitter-follower, and thus a signal 162 (FIGURE 4J) which goes positive at t2, is applied from emitter 78*e* over diodes 94 and 95 to the bases of transistors 80 and 81. As is apparent from the foregoing explanation of the operation of the near end pulse generator, between times t0 and t2 the ground potential applied over the diodes effectively clamps bases 80*b* and 81*b* to ground and prevents the conduction of transistors 80 and 81, notwithstanding the application of a positive bias potential over either of conductors 48 and 51. At time t2 the control signal 162 applied over diodes 94 and 95 goes positive as indicated in FIGURE 4J, permitting the bias potentials applied from potentiometers 96 and 100 to control the conduction of transistors 80 and 81. To maintain transistor 80 non-conductive, ground potential is applied from potentiometer 96 over resistor 98 to base 80*b*. A positive bias potential is applied from far end bias potentiometer 100 over resistor 102 to base 81*b* of transistor 81. As illustrated in FIGURE 4K, this positive bias potential can be of a high level as identified by curve 164, of an intermediate or less positive level as indicated by waveform 165, or of a lower level as identified by numeral 166. For purposes of the present explanation it is assumed that a bias potential as indicated by curve 164 is applied to base 81*b* to cause transistor 81 to conduct at a high level between t2 and t3.

Figures 4K, 4L, 4M, 4N, 4P:
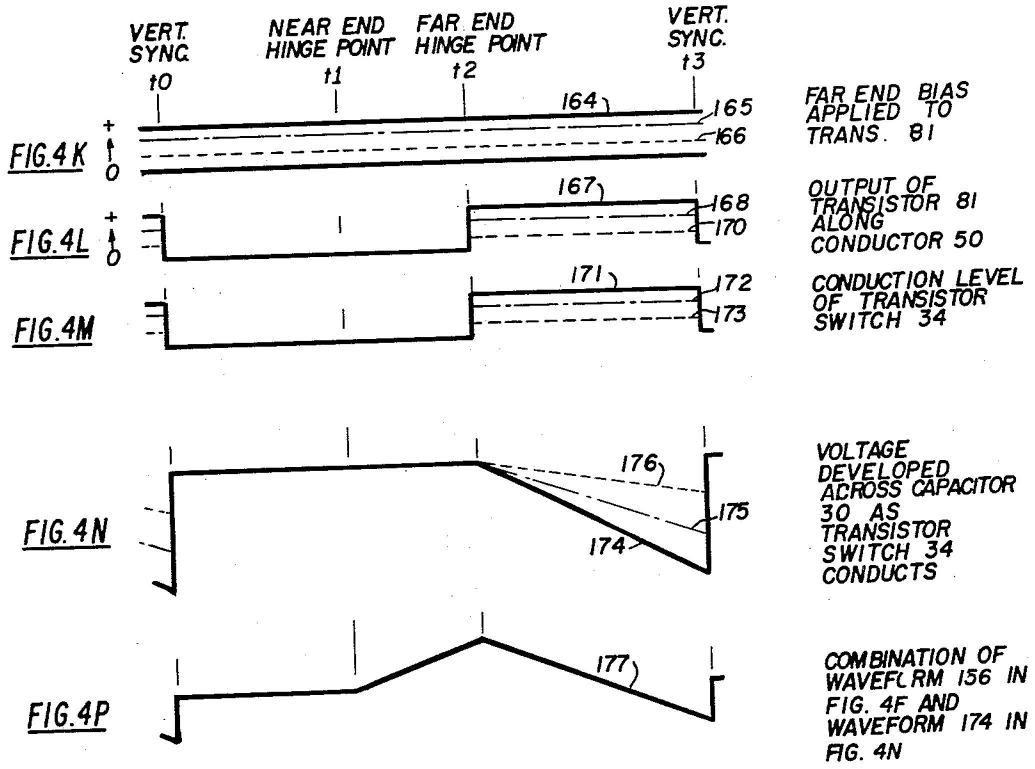

The output signal from transistor 81 which is transmitted over conductor 50 and applied to base 34*b* of negative switch 34 is shown in FIGURE 4L. A bias potential of high level applied to base 81*b* produces an output signal such as that referenced by numeral 167 in FIGURE 4L, a bias potential which is less positive produces an output signal of intermediate level as indicated by numeral 168, and a less positive bias potential produces an output signal such as identified by numeral 170.

The level of the output signal applied to base 34*b* of the negative switch controls the conduction level of transistor switch 34 between times t2 and t3. That is, the amplitude of the current flow from negative potential at conductor 122 into the emitter of negative transistor switch 34 and out of the collector of this transistor to conductor 31 is a function of the conduction level of transistor 34, and different gradient waveforms produced by different charging rates are identified by numerals 174, 175 and 176 in FIGURE 4N. The waveform of steepest gradient, 174, is produced with maximum conduction of negative switch transistor 34. Thus, if positive transistor switch 33 were non-conductive during the interval t2 to t3, the waveform developed across capacitor 30 would be represented by the segment of waveform 174 illustrated between times t2 and t3.

However, as evident from the foregoing explanation, transistor switch 33 continues to conduct from t2 to t3. Accordingly the charging current which produces the net charge accumulation across capacitor 30 during this interval is a function of the conduction of both of transistor switches 33 and 34. Assuming that negative switch 34 is conducting at a higher level than is transistor switch 33, current flows from negative supply potential at conductor 122 over negative switch 134 to conductor 31, at which point the current divides. A portion of this current is passed through positive transistor switch 33 and resistor 111 to positive potential at conductor 110, and the remainder of the current is passed over conductor 31 and capacitor 30 to ground. Thus, with the conduction level of negative switch 34 exceeding that of transistor 33, a net negative charge accumulation is provided across capacitor 30. Thus, by effectively combining the waveforms such as waveform 174 in FIGURE 4N and waveform 156 in FIGURE 4F, a composite waveform such as that illustrated by numeral 177 in FIGURE 4P is produced. Reference to FIGURE 4A indicates that the composite waveform 177 produced by the above-described circuit operations corresponds to the desired output voltage waveform 15.

From FIGURE 4A and the foregoing explanation, it is evident that a net negative charge has been accumulated across capacitor 30 by the action of the circuitry in providing the voltage waveform 15. Accordingly, as a negative sync pulse is applied at time t3 from terminal 53A of the sync generator over capacitor 136 to the base of negative discharge transistor 128 simultaneously with the application of a positive sync pulse from terminal 53B over capacitor 133 to the base of positive discharge capacitor 127, each of transistors 127 and 128 is gated on or rendered conductive, but the polarity of diode 130 prevents removal of the accumulated negative charge over transistor 127. Instead, the accumulated negative charge is removed from capacitor 30 over diode 131 and the collector-emitter path of negative discharge transistor 128 to ground during the brief interval in which the sync pulse renders transistor 128 conductive. Had a net positive charge been accumulated across capacitor 30, a related action would have occurred in which the accumulated charge is removed by conduction of positive discharge transistor 127, the discharge circuit extending from the upper plate of capacitor 30 over diode 130 and the collector-emitter path of positive discharge transistor 127 to ground.

If it is desired to produce a negative-going waveform between times *t1* and *t2*, transistor 60 is maintained nonconductive by the applied D.-C. bias potential and transistor 61 is rendered conductive during this interval to gate on negative switch 34 and produce the desired negative charging current. Given a waveform of negative slope during this interval, if it is desired to change the slope to a positive-going gradient at time *t2*, or at the far end hinge point, positive switch 33 is gated on to conduct at a level exceeding the conduction level of negative switch 34 at this time. Conversely, in the development of waveform 15 illustrated in FIGURE 4A, had it been desired to maintain a positive-going waveform between times *t2* and *t3* but only change the slope to a lesser gradient during this interval, positive switch 33 can be maintained conductive at the same level, and negative switch 34 gated on to conduct at a level less than that of positive switch 33. Thus the total current through transistor 33 is the sum of the positive charging current flowing from ground over capacitor 30 to conductor 31 and the current flowing from negative supply conductor 122 over negative switch 34 to conductor 31. This composite current then flows through positive transistor switch 33 and resistor 111 to positive supply potential and conductor 110. Those skilled in the art will recognize that by changing the conduction levels and selecting which of the positive and negative switches 33 and 34 is to conduct during a given time interval, an infinite variety of waveform representations can be produced. The times or hinge points at which the gradients or slopes are altered can be readily adjusted, as explained in connection with potentiometer 87 in the far end pulse generator. By adding any desired number of pulse generators in cascade, a corresponding number of variable gradient sections can be produced in a given charging cycle. Thus the flexibility of the system in producing various information displays is apparent. Moreover, the information is represented with great accuracy, in that the flow of charging current to capacitor 30 is extemely linear because the positive and negative switches act as constant-current devices with an effective conduction level regulated by the level of the gating signal applied thereto.

In addition to the accuracy of the generated waveform, the gradient of the waveform is readily varied by a simple adjustment of a potentiometer, to change the effective amplitude of a square wave gating signal.

In order to assist those skilled in the art to readily practice the invention, and in no sense by way of limitation, a list of the identification or value of the different circuit elements utilized in an embodiment of the invention which operated successfully is given hereat. Certain of the components depicted generally in FIGURE 3, such as sync generator 53, near end pulse generator 35, and vertical sawtooth generator 75, are not referenced hereat, the provision of such circuitry being well known and understood by those skilled in the art.

| Component: | Identification or value |
|---|---|
| Transistors— | |
| **33** | 2N327A |
| **34** | 2N334 |
| **40** | 2N332 |
| **60** | 2N336 |
| **61** | 2N336 |
| **76** | 2N336 |
| **77** | 2N336 |
| **78** | 2N336 |
| **80** | 2N336 |
| **81** | 2N336 |
| **123** | 2N336 |
| **124** | 2N336 |
| **127** | 2N332 |
| **128** | 2N327A |

| Component: | Idenification or value |
|---|---|
| Diodes or rectifiers— | |
| **63** | 1N457 |
| **64** | 1N457 |
| **88** | 1N457 |
| **94** | 1N457 |
| **95** | 1N457 |
| **116** | 1N457 |
| **118** | 1N457 |
| **130** | 1N191 |
| **131** | 1N191 |
| Thermistors— | |
| **107** ohms | 300 |
| **121** do | 300 |
| Resistors— | |
| **65** kilohms | 15 |
| **66** do | 15 |
| **70** do | 100 |
| **73** do | 100 |
| **85** do | 47 |
| **90** do | 150 |
| **92** do | 15 |
| **93** do | 10 |
| **98** do | 100 |
| **99** do | 150 |
| **102** do | 100 |
| **103** do | 150 |
| **104** do | 15 |
| **105** do | 150 |
| **106** do | 22 |
| **108** do | 1.2 |
| **109** do | 150 |
| **111** do | 1 |
| **114** do | 15 |
| **115** do | 68 |
| **117** do | 68 |
| **120** do | 8.2 |
| **125** do | 47 |
| **126** do | 8.2 |
| **132** do | 22 |
| **135** do | 22 |
| Potentiometer— | |
| **87** do | 50 |
| Capacitors— | |
| **30** microfarads | 0.1 |
| **74** do | 2 |
| **82** do | 2 |
| **84** do | 2 |
| **133** do | 0.47 |
| **136** do | 0.47 |
| Supply voltages— | |
| B1+ volts | +45 |
| B2+ do | +20 |
| B2− do | −20 |

While only a particular embodiment of the invention has been disclosed and illustrated, it is apparent that modifications and alterations may be made therein, and it is intended in the appended claims to cover all such modifications and alterations as may fall within the true spirit and scope of the invention.

What is claimed is:

1. A waveform generating circuit comprising energy storage means, an energizing circuit for said energy storage means including switching means operable to a first condition to establish a current flow to said energy storage means at a constant charging rate and to a second condition to terminate said current flow, gating means coupled to said switching means for applying thereto a gating signal to operate said switching means to said first condition, output means, a first means connected to said energy storage means operative to couple a sloping waveform to said output means responsive to operation of said switching means to said first condition, and a second means coupled to said energy storage means selectively operative to provide a vertical edge for said sloping waveform prior to coupling to said output means.

2. A waveform generating circuit comprising: energy storage means; an energizing circuit coupled to said energy storing means including a first switching means operable to a first condition to conduct a charging current in a given direction to said energy storage means, and a second switching means operable to a first condition to conduct a charging current in a direction opposite to said given direction to said energy storage means, the conduction levels of said first and second switching means determining the gradient of the waveform developed across said energy storage means; gating means, coupled to said first and second switching means, including means for applying a first set of gating signals to said first switching means to increase and decrease the conduction level of said first switching means to said energy storage means during generation of a waveform and means for applying a second set of gating signals to said second switching means; to increase and decrease the conduction level of said second switching means to said energy storage means during waveform generation output means; and means coupled to said energy storage means for extending to said output means a sawtooth waveform having a gradient determined by the amplitude of said first and second set of gating signals coupled to said first and second switching means.

3. A waveform generating circuit comprising energy storage means for developing a voltage waveform, a first switching means operable to a first condition to conduct a charging current to provide a voltage of a first polarity on said energy storage means, a second switching means operable to a first condition to conduct a charging current to provide a voltage of a second polarity on said energy storage means, the gradient of the waveform developed over any interval being determined by the charging current coupled to the energy storage means over said interval, and gating means for coupling gating signals to each of said first and second switching means to operate same to said first condition including means operable to selectively vary a characteristic of said gating signals which varies the amplitude of the charging current conducted by said first and second switching means, whereby the gradient and the direction of slope of the waveform may be changed in an increasing and decreasing direction at any given interval.

4. A waveform generating circuit comprising energy storage means for developing a voltage waveform, a first switching means operable to a first condition to couple a charging current to provide a voltage of a first polarity on said energy storage means, a second switching means operable to a first condition to couple a charging current to provide a voltage of a second polarity on said energy storage means, the gradient of the waveform developed over any interval being determined by the charging current coupled to the energy storage means over said interval, and gating means for coupling hinged point gating signals to said first and second switching means to control the interval of variation of the gradient of the waveform in alternatively an increasing and decreasing direction from each hinged point, the amplitude of the gating signals for each of said switching means determining the gradient of the resultant waveform developed across said energy storage means.

5. A waveform generating circuit comprising energy storage means for developing a voltage waveform, a first switching means operable to a first condition to establish a charging current flow in a direction to provide a voltage of a first polarity on said energy storage means, a second switching means operable to a first condition to establish a charging current flow in a direction to provide a voltage of a second polarity on said energy storage means, the gradient of the waveform developed over any interval being determined by the charging current coupled to the energy storage means over said interval, and gating means for coupling a first set of gating signals to said first switching means and a second set of output signals to said second switching means to selectively increase and decrease the current flow over the first and second switching means including means operable to generate synchronizing gating signals for said first and second switching means including a synchronizing signal for determining the time for initiating each waveform, and means operable to generate hinge point signals for determining the interval of variation of the gradient of the waveform.

6. A waveform generating circuit comprising energy storage means for developing a voltage waveform, a first switching means operable to a first condition to generate a charging current to establish a potential of a first polarity on said energy storage means, a second switching means operable to a first condition to generate a charging current to establish a potential of a second polarity on said energy storage means, the gradient of the waveform developed over any interval being determined by the charging current coupled to the energy storage means over said interval, gating means for coupling signals to each of said first and second switching means including means operable to generate hinge point signals for determining the interval of variation of the gradient of the waveform, and direction adjust means operable to control the direction of the slope of the waveform at each hinge point in an increasing and decreasing direction.

7. A waveform generating circuit comprising energy storage means for developing a voltage waveform, a first switching means operable to a first condition to generate a charging current to establish a potential of a first polarity on said energy storage means, a second switching means operable to a first condition to generate a charging current to establish a potential of a second polarity on said energy storage means, the gradient of the waveform developed over any interval being determined by the charging current coupled to the energy storage means over said interval, and gating means for coupling gating signals to each of said first and second switching means including means operable to generate hinge point signals for determining the interval of variation of the gradient of the waveform, and direction control means operable to provide control signals for said first and second switching means to selectively vary the direction of the slope of the waveform at each hinge point in alternatively an increasing and decreasing direction.

8. A waveform generating circuit comprising energy storage means connected for use in developing a voltage waveform, a switching generator means including means selectively operable to generate charging currents for coupling to said storage means to provide potentials of variable amplitudes and polarity on said energy storage means, the amplitude of the charging current at any given time determining the gradient of the waveform at such time and the direction of flow of the charging current at any given time determining the direction of the slope of the waveform at such time, directional control means for providing signals for determining the direction of flow of the charging current provided by said generator at any interval during generation of the waveform including a first and a second control means for alternatively effecting an increasing and decreasing slope from the selected interval on the waveform, and timer means operable to control the interval of enablement of said directional control means during each waveform generation.

9. A waveform generating circuit comprising energy storage means for use in developing a voltage waveform, a switching generator means including means selectively operable to generate at least a first and a second charging current of variable amplitude and directional flow for coupling to said energy storage means, the amplitude of the charging currents at any given time determining the gradient of the waveform at such time and the polarity of the charging currents at any given time determining the direction of the slope of the waveform at such time, and directional means including means adjustable to different positions to correspondingly adjust the polarity and amplitude of each of the charging currents to correspondingly different values to thereby alternatively provide an increasing and decreasing slope at different intervals of the waveform.

10. A waveform generating circuit comprising energy storage means for developing a voltage waveform thereacross, a first switching means for controlling the provision of a first constant charging current which establishes a potential of a first polarity on said storage means, a second switching means for controlling the provision of a second constant charging current which establishes a potential of a second polarity on said storage means, and control means including means for coupling the charging currents provided by said first and second switching means over a common path to said energy storage means, whereby the amplitude and direction of the gradient of the resultant waveform at any time are determined by the algebraic sum of the respective charging currents coupled to said energy storage means at such time, a first switching generator means connected to selectively couple gating signals to said first and said second switching means to adjust the charging current of both said first and said second switching means to different values to establish a potential of a variable polarity and amplitude on said energy storage means, and a second switching generator means connected to selectively couple gating signals to said first and said second switching means to adjust the charging currents to different values to establish a potential of a variable polarity and amplitude on said energy storage means, whereby the slope of the wave may be increased and decreased at multiple intervals.

11. A waveform generating circuit as set forth in claim 10 in which at least one of said switching generator means includes directional control means adjustable to selectively enable different ones of said current sources.

12. A waveform generating circuit as set forth in claim 10 which includes synchronizing means for determining the time of generation of each waveform, means in each of said switching generator means including directional control means adjustable to selectively enable different ones of said switching means, and hinge point means coupled to said synchronizing means operable to determine the interval of enablement of the selected one of said switching means in each waveform generation.

13. A waveform generating circuit as set forth in claim 10 which includes synchronizing means for determining the time of generation of each waveform, a discharge circuit for said energy storage means, and means coupled to said synchronizing means operative to complete said discharge circuit at the termination of each waveform generation.

14. A waveform generating circuit as set forth in claim 10 which includes a source of sawtooth waves and in which at least one of said switching generator means comprises timer means including means for deriving square wave pulses from said sawtooth waves, and directional control means including means controlled by the leading edge of each square wave to enable one of said current sources in the provision of a charging current.

15. A waveform generating circuit comprising first and second semiconductor switches, energy storage means coupled to said first and second semiconductor switches for storing a charge of given polarity as said first semiconductor switch is rendered conductive and for storing a charge of a polarity opposite said given polarity as said second semiconductor switch is rendered conductive, gating means operative to apply gating signals to each of said first and second semiconductor switches to selectively render said switches conductive, the polarity and the rate of charge accumulation across said energy storage means being thereby determined by the algebraic sum of the current outputs of said first and second semiconductor switches, and output means coupled to said energy storage means for extending to associated equipment a voltage of a waveform determined by the conduction times and conduction levels of said first and second semiconductor switches.

16. A waveform generating circuit comprising first and second semiconductor switches, first input means for applying a voltage of given polarity to said first semiconductor switch, second input means for applying a voltage of a polarity opposite said given polarity to said second semiconductor switch, energy storage means coupled to said first and second semiconductor switches for storing a charge of said given polarity as said first semiconductor switch is rendered conductive and for storing a charge of said opposite polarity as said second semiconductor switch is rendered conductive, gating means connected to couple square wave gating signals to each of said first and second semiconductor switches including means for varying the time duration of said square wave gating signal to correspondingly vary the conduction times of said switches and thus regulate the duration of charge accumulation across said energy storage means, bias control means coupled to said first and second semiconductor switches for applying thereto bias voltage signals of adjustable level to regulate the effective level of said square wave gating signal and thereby correspondingly vary the current conduction by each of said semiconductor switches to said energy storage means, a discharge circuit coupled in parallel with said energy storage means operative as energized to remove the charge accumulated across said energy storage means at the end of each waveform-developing cycle, and output means coupled to said energy storage means for extending to associated equipment a voltage of a waveform determined by the conduction times and conduction levels of said first and second semiconductor switches.

References Cited in the file of this patent

UNITED STATES PATENTS

| | | |
|---|---|---|
| 2,602,151 | Carbrey | July 1, 1952 |
| 3,007,055 | Herzfeld | Oct. 31, 1961 |
| 3,007,060 | Guenther | Oct. 31, 1961 |
| 3,064,144 | Hardy | Nov. 13, 1962 |

UNITED STATES PATENT OFFICE

CERTIFICATE OF CORRECTION

Patent No. 3,150,272 September 22, 1964

Jerold H. Gard

It is hereby certified that error appears in the above numbered patent requiring correction and that the said Letters Patent should read as corrected below.

Column 15, line 20, strike out the semicolon; line 22, after "generation" insert a semicolon.

Signed and sealed this 27th day of July 1965.

(SEAL)
Attest:

ERNEST W. SWIDER
Attesting Officer

EDWARD J. BRENNER
Commissioner of Patents